United States Patent
Harada

(10) Patent No.: US 6,811,743 B2
(45) Date of Patent: Nov. 2, 2004

(54) METHOD AND APPARATUS FOR SUPPLYING GRANULAR RAW MATERIAL FOR REDUCED IRON

(75) Inventor: Takao Harada, Osaka (JP)

(73) Assignee: Kabushiki Kaisha Kobe Seiko Sho, Kobe (JP)

(*) Notice: Subject to any disclaimer, the term of this patent is extended or adjusted under 35 U.S.C. 154(b) by 0 days.

(21) Appl. No.: 10/286,841

(22) Filed: Nov. 4, 2002

(65) Prior Publication Data

US 2003/0102610 A1 Jun. 5, 2003

Related U.S. Application Data

(62) Division of application No. 09/639,110, filed on Aug. 16, 2000, now Pat. No. 6,500,381.

(30) Foreign Application Priority Data

Aug. 30, 1999 (JP) ........................................... 11-243406
Aug. 30, 1999 (JP) ........................................... 11-243407

(51) Int. Cl.$^7$ ............................................... C22B 1/10
(52) U.S. Cl. ...................................... 266/176; 266/172
(58) Field of Search ............................... 266/172, 176, 266/177, 178, 191, 183; 432/239

(56) References Cited

U.S. PATENT DOCUMENTS 5,759,232 A * 6/1998 Takahashi et al. .......... 266/176
5,885,521 A * 3/1999 Meissner et al. ........... 266/179
6,500,381 B1 * 12/2002 Harada ....................... 266/172

FOREIGN PATENT DOCUMENTS

DE 2045696 * 3/1972
WO WO 98/54526 12/1998

* cited by examiner

Primary Examiner—Scott Kastler
(74) Attorney, Agent, or Firm—Oblon, Spivak, McClelland, Maier & Neustadt, P.C.

(57) ABSTRACT

A method for supplying a granular raw material for reduced iron in which when the granular raw material is fed into a hopper and from there supplied onto a hearth of a movable hearth furnace through a material supplying device, the material supplying device is moved vertically to thereby adjust the gap between the lower end of the material supplying device and the hearth. Thus, the amount of granular raw material supplied onto the hearth of the movable hearth furnace is adjustable. Further, granular raw material is dispersed in the hearth width direction over the entire surface of the hearth of the movable hearth furnace with minimal breakage or pulverization of the granular raw material for reduced iron and leveled by a spiral vane rotated on the downstream side, with respect to a hearth moving direction, of a material discharge outlet of the material supplying device.

8 Claims, 7 Drawing Sheets

METHOD AND APPARATUS FOR SUPPLYING GRANULAR RAW MATERIAL FOR REDUCED IRON

CROSS-REFERENCE TO RELATED APPLICATIONS

This application is a Divisional of U.S. patent application Ser. No. 09/639,110 filed Aug. 16, 2000 now U.S. Pat. No. 6,500,381, which is based upon and claims the benefit of priority from Japanese Patent Application No. 11-243406 filed Aug. 30, 1999, and Japanese Patent Application No. 11-243407 filed Aug. 30, 1999, the entire contents of which are incorporated herein by reference in their entirety.

BACKGROUND OF THE INVENTION

1. Field of the Invention

The present invention relates to a method and an apparatus for supplying a granular raw material for reduced iron, whose main components are carbonaceous material as reductant and iron oxide, onto a hearth and, in particular, to a method and an apparatus for supplying a granular raw material for reduced iron in which the supply amount of such a material is adjusted or a leveling method and a leveler for dispersing and leveling such a material over an entire hearth when supplying the material to a reduction furnace for reduction.

2. Description of the Related Art

Conventionally, when supplying a pellet-like or briquette-like granular raw material for reduced iron, whose main components are carbonaceous material as reductant and iron oxide, to a movable-hearth furnace, the granular raw material for reduced iron, which is obtained through granulation by a granulating machine, is dried by a drying furnace, and then supplied onto the hearth of the movable-hearth furnace by conveying it by a supplying apparatus, such as a belt conveyor or an oscillating conveyor. To adjust the supply amount, the conveying speed of the belt conveyor or the frequency of the oscillating conveyor is adjusted.

A means for supplying a granular raw material for reduced iron other than belt conveyors or oscillating conveyors is disclosed, for example, in U.S. Pat. No. 5,885,521. As shown in FIG. 8, which is a schematic side view of a supplying apparatus, showing a material to be supplied and a pellet leveler, in the supply means as disclosed in the above-mentioned U.S. patent, a granular raw material for reduced iron dried by a drying furnace is supplied to a hearth 36 of a rotary hearth furnace, which is a movable-hearth furnace, through a supply pipe 102, which is perpendicular to the hearth. By means of a pellet leveler 104 (adjustable gate) provided on a side surface of the forward end portion of the pipe 102, which serves as a leveling means, the gap of the discharge outlet is adjusted.

In the drawing, numeral 112 indicates a leveler, serving as a leveling means like the leveler 104. The leveler 112 levels the granular raw material for reduced iron to a single or double layer depth.

The supply amount adjusting means which adjusts the amount of granular raw material for reduced iron supplied onto the hearth by adjusting the conveying speed of the belt conveyor or the frequency of the oscillating conveyor, has the following problems to be solved. During normal operation, the amount of the material discharged from the granulating machine and the drier fluctuates greatly, so that it is difficult to control with high accuracy the amount of the material supplied onto the hearth of the movable-hearth furnace. When the supply amount fluctuates, the operating conditions for the furnace fluctuates due to variation in the heat load of the burner. Further, the number of layers of the material laid on the hearth fluctuates, and the material heating condition varies, resulting in a deterioration in the quality of the reduced iron to be obtained as the product.

When an oscillating conveyor is used for conveying the granular raw material for reduced iron, the material will be broken or pulverized due to the oscillation during the conveyance or the shock as a result of falling onto the hearth. This makes it impossible for reduction to be effected to a sufficient degree, resulting in a deterioration in the quality of the granular reduced iron obtained as the product. Further, a part of the powder generated will be scattered in the flue gas as a secondary dust, resulting in a reduction in yield. Further, it is to be noted that, for effective utilization of the secondary dust, it is desirable for the amount of metal, such as zinc or lead, which is evaporated from the material as a result of the heating and reduction in the furnace, to be large. However, since the powder of the material is mixed with the secondary dust, the value of the secondary dust deteriorates.

When the movable-hearth furnace is a rotary hearth furnace, the supplied granular raw material for reduced iron goes around inside the furnace before it is discharged to the exterior of the furnace as granular reduced iron, so that the discharge position for the granular reduced iron is close to the supply position for the material. Of course, the interior of the furnace must be maintained at high temperature by combustion gas or the like, and negative pressure is maintained in the interior of the furnace so that the high-temperature gas or unburned gas may not leak to the exterior of the furnace. However, when a belt conveyor or an oscillating conveyor is used as the supply amount adjusting means, a large gap must be provided at the supply inlet for the material. Thus, outside air is allowed to enter through this gap, and the granular reduced iron undergoes oxidation again, resulting in a deterioration in the quality of the granular reduced iron.

On the other hand, when the above-mentioned pellet leveler, provided on a side surface of the forward end portion of the material supply means, is used as the supply amount adjusting means, the above problem experienced with the belt conveyor or the oscillating conveyor may be mitigated to some degree. However, it cannot be called satisfactory since it does not help to adjust the supply amount of the granular raw material for reduced iron with high accuracy. That is, although the gap can be adjusted, it is not possible to adjust the gap during operation, and the amount of the material supplied onto the hearth is adversely affected, for the fluctuation in the amount of material discharged from the drier and the fluctuation in the average size of the material cannot be coped with. When the pellet leveler is provided at a fixed position, without undergoing vertical fine adjustment, the pellet leveler is mounted in such a way as to hinder a part of the flow of the material, so that the thinner the material layer on the hearth, the larger the degree to which the material collapses, resulting in an increase in the amount of material in the form of powder or pieces.

Further, a granular raw material for reduced iron contains oily components, such as tar or oil as in the case of coal or ironworks dust, and the oily component adheres to the inner wall of the supply pipe, which is at high temperature due to radiation heat from the hearth, and grows gradually. As a result, the discharge of the material from the pipe is hindered, and the pipe is clogged in the end, making it impossible to adjust the supply amount of the material with high accuracy.

SUMMARY OF THE INVENTION

Accordingly, it is a first object of the present invention to provide a supply amount adjusting method and a supply device for a granular raw material for reduced iron in which it is possible to prevent intrusion of outside air into the furnace and breaking or pulverization of the granular raw material for reduced iron and in which the gap is adjust from outside the movable hearth furnace, thereby making it possible to adjust with high accuracy the amount of granular raw material for reduced iron supplied onto the hearth of the furnace.

In the supply amount adjusting method for a granular raw material for reduced iron of the present invention, when feeding the granular raw material for reduced iron into the material receiving hopper and supplying it onto the hearth of the movable hearth furnace from the material receiving hopper through a material supply means, preferably, a cylindrical member, the material supply means is moved vertically to thereby adjust the gap between the lower end of the material supply device and the hearth.

In this case, the fluctuation in the amount of granular raw material for reduced iron fed into the material receiving hopper is absorbed, and the interior of the material supply means is maintained in a condition in which it is filled with the granular raw material for reduced iron, that is, substantially in an enclosed state, so that it is possible to reduce the amount of outside air allowed to enter the movable hearth furnace. Further, the gap between the lower end of the material supply means and the hearth can be adjusted, whereby it is possible to adjust with high accuracy the amount of granular raw material for reduced iron supplied onto the hearth of the movable hearth furnace. Further, as stated above, the interior of the supply means is filled with granular raw material for reduced iron, so that it is possible to reduce the speed at which the granular raw material for reduced iron is dropped onto the hearth.

It is desirable to cool the above-mentioned cylindrical member.

When the material supply means is at high temperature, the oily component contained in the granular raw material for reduced iron adheres to the inner wall of the cylindrical member serving as the material supply means, so that the discharge of the granular raw material for reduced iron from the cylindrical member is gradually hindered, and there is the danger of the member being eventually clogged. However, since the cylindrical member is cooled, no oily component adheres to the inner wall of the cylindrical member.

The supply device for a granular raw material for reduced iron of the present invention for realizing the above supply amount adjusting method, comprises a material receiving hopper for receiving the granular raw material for reduced iron, a material supply means for supplying the granular raw material for reduced iron received by the material receiving hopper onto the hearth of a movable hearth furnace, and a gap adjusting means for vertically moving the material supply means to thereby adjust the gap between the lower end of the material supply means and the hearth.

In the above-described supply device for a granular raw material for reduced iron, it is further desirable to provide a cooling means for cooling the material supply means, preferably the cylindrical member.

Next, a second object of the present invention is to provide a method and an apparatus for leveling a granular raw material for reduced iron which do not adversely affect the productivity of the granular reduced iron, and in which there is no fear of the granular raw material for reduced iron being broken or pulverized, making it possible to reliably disperse and level the granular raw material for reduced iron supplied to the movable hearth furnace over the entire surface of the hearth.

In the method of leveling a granular raw material for reduced iron of the present invention, the granular raw material for reduced iron is supplied onto the hearth of a movable hearth furnace through a material supply means, and the granular raw material for reduced iron on the hearth is moved in the hearth width direction by rotating a spiral vane on the downstream side of the material discharge outlet for discharging the granular raw material for reduced iron from the material supply means with respect to the hearth moving direction, dispersing and leveling the material on the hearth surface.

In this case, the granular raw material for reduced iron on the hearth is moved in the hearth width direction by a rotating spiral vane, whereby the granular raw material for reduced iron on the hearth can be dispersed in the hearth width direction.

It is desirable to control the apparatus such that when the amount of the granular raw material for reduced iron supplied from the material supply means is increased or the average diameter thereof is increased, the distance between the hearth and the spiral vane is increased, and that when the supply amount is reduced or the average diameter of the material is reduced, the distance between the hearth and the spiral vane is reduced.

In this case, it is possible to disperse the granular raw material for reduced iron in the hearth width direction without applying an excessive crushing force thereto.

It is desirable to move the granular raw material for reduced iron supplied from the material supply means toward both ends from a position near the center with respect to the hearth width direction by means of the spiral vane.

It is desirable to move the granular raw material for reduced iron supplied from the material supply means toward both ends with respect to the hearth width direction to disperse it, using the material supply means or a position near the center of the material discharge outlet as a movement junction.

Further, it is desirable to cool the rotation shaft around which the spiral vane is provided.

An apparatus for realizing the method for leveling a granular raw material for reduced iron comprises a material supply means for supplying a granular raw material for reduced iron onto a hearth of a movable hearth furnace, and a granular raw material for reduced iron leveling means arranged on the downstream side of a material discharge outlet through which the granular raw material for reduced iron is discharged from the material supply means with respect to a hearth moving direction and adapted to disperse and level the granular raw material for reduced iron supplied onto the hearth over the upper surface of the hearth, wherein the leveling means comprises a rotation shaft rotated in the movable hearth furnace, a leveling member provided in the outer periphery of the rotation shaft and consisting of a spiral vane for moving the granular raw material for reduced iron on the hearth in the hearth width direction, and a rotating device for rotating the rotation shaft.

It is desirable for the rotation shaft to be supported so as to be vertically movable by a shaft raising/lowering device.

In this case, it is possible to raise or lower the shaft in accordance with the increase/decrease speed of the supply amount of the granular raw material for reduced iron or the variation speed of the average diameter of the material, whereby it is possible to disperse the material in the hearth width direction without applying an excessive crushing force to the granular raw material for reduced iron.

It is desirable for the spiral vane to be composed of a left-turn vane and a right-turn vane.

In this case, it is possible to move the granular raw material for reduced iron supplied from the material supply means toward both ends from a position near the center of the hearth with respect to the hearth width direction to disperse the material.

It is desirable for the left-turn vane and the right-turn vane of the spiral vane to be separated at the material supply means or at a position near the center of the material discharge outlet.

In this case, the reduced iron material supplied from the material supply means can be moved to both ends with respect to the hearth width direction to disperse the material, using the material supply means or a position near the center of the material discharge outlet as a movement junction.

Further, it is desirable to provide the leveling member with a cooling means for cooling the rotation shaft.

In this case, the thermal expansion of the rotation shaft of the cooling member is restrained by cooling, and the rotation of the leveling member is not hindered, so that it is possible to continue to cause the leveling member to rotate smoothly during the operation of reducing the granular raw material for reduced iron.

Further, by applying the leveling method and leveling apparatus according to the second aspect of the invention to the method and apparatus for supplying a granular raw material for reduced iron according to the first aspect of the invention, it is possible to advantageously achieve a synergistic effect.

DESCRIPTION OF THE PREFERRED EMBODIMENTS

The apparatus for supplying a granular raw material for reduced iron for realizing the supply amount adjusting method for a granular raw material for reduced iron will be described with reference to FIG. 1, which is a schematic diagram showing a main portion of a movable hearth furnace, and FIG. 2, which is a schematic diagram showing a cylindrical member serving as a material supplier (with a raising/lowering bracket being omitted).

Figure 1:
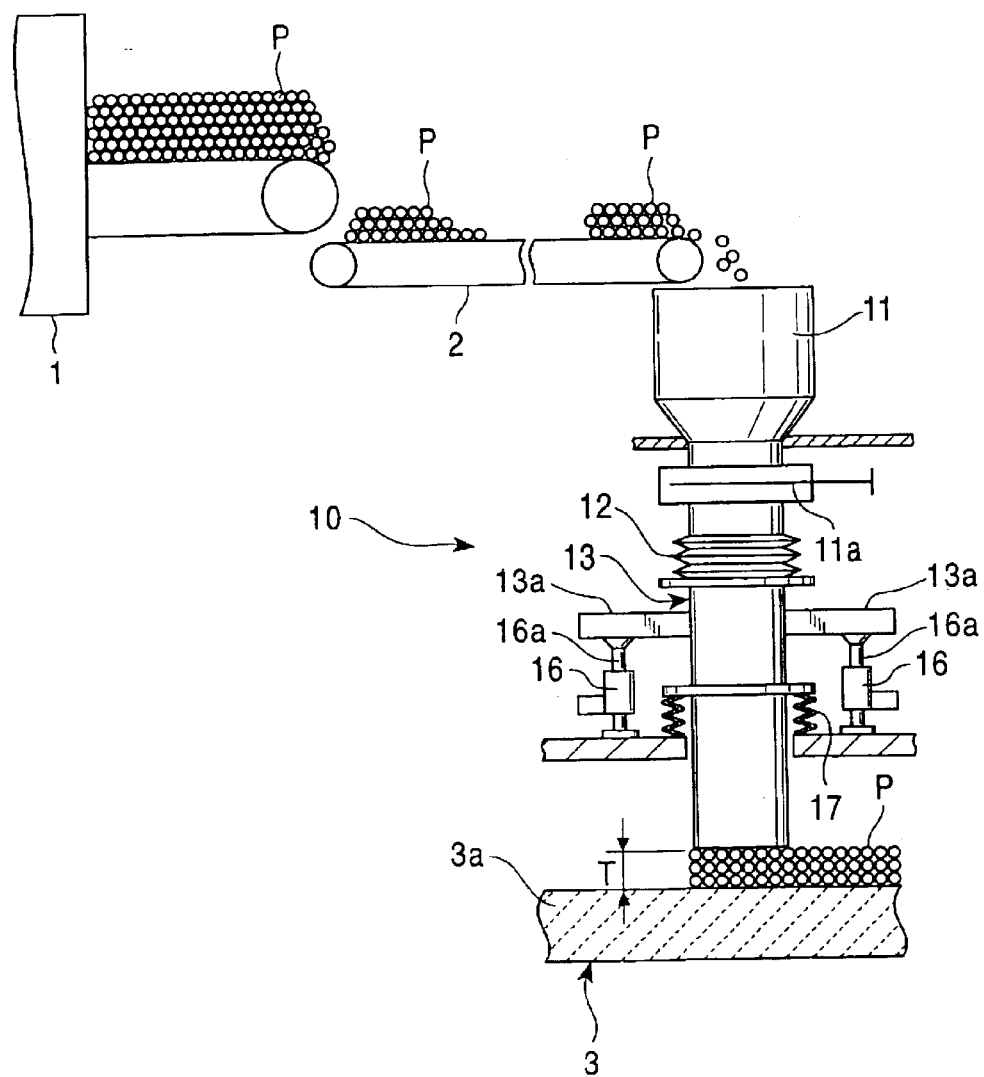
FIG. 1 is a schematic diagram illustrating a supplying apparatus according to the first aspect of the present invention, including a main portion of a movable hearth furnace.

In FIG. 1, numeral 1 indicates a drier. A granular raw material for reduced iron (hereinafter referred to as "pellet") whose main components are carbonaceous material as reductant and iron oxide and which has been dried by the drier 1 is conveyed by a belt conveyor 2, and conveyed onto a hearth 3a of a movable hearth furnace 3 through a supply device 10 described below. The hearth 3a may be a disc-like type which rotates or a linear type which moves linearly.

The supply device 10 comprises a material receiving hopper 11 having a slide gate 11a at its discharge outlet and adapted to receive pellets P fed from the belt conveyor 2, a cylindrical member 13 described below which is mounted to the lower portion of the hopper 11 through the intermediation of an upper bellows-like contractive member 12 and which adapted to supply the pellets P received by the hopper 11 onto the hearth 3a, and electric cylinders 16 adapted to move the cylindrical member vertically so as to freely adjust the gap T between the lower end of the cylindrical member 13 and the hearth 3a. The slide gate 11a solely allows the pellets P in the hopper 11 to be discharged and stops the discharge, and is in the open state during normal operation.

A bellows-like lower contractive member 17 is fitted onto the cylindrical member 13 at the position where it passes through the movable hearth furnace 3. The upper end of the lower contractive member 17 is fastened to a flange provided in the outer periphery of the cylindrical member 13, and the lower end thereof is fastened to the hearth furnace 3, whereby outside air is prevented from entering the hearth furnace 3. Further, as in the case of U.S. Pat. No. 5,885,521, there is provided on the right-hand side as seen in the drawing a leveler for dispersing and leveling the pellets P supplied from the cylindrical member 13 over the hearth 3a.

Here, it is desirable to apply the leveler according to the second aspect of the present invention. In this case, the granular raw material for reduced iron is moved in the hearth width direction by means of a spiral vane of a leveling member rotated by a rotating device, whereby the material can be dispersed in the hearth width direction. Due to this arrangement, the pellets P are less subject to breakage or pulverization, and can be reliably dispersed and leveled over the entire surface of the hearth 3a. Thus, the pellets P are reduced to a sufficient degree, so that the quality of the granular reduced iron is improved. Further, since the amount of material scattered in the flue gas as the secondary dust is small, a reduction in yield is not involved.

Next, the electric cylinders 16 are arranged above the hearth furnace 3, and can push upward a raising/lowering bracket 13a which protrudes outer periphery of the cylindrical member 13 at a position near the center with respect to the vertical direction thereof. That is, when the contractive rods 16a of the electric cylinders 16 are expanded, the material supplier 13 is pushed upward through the raising/lowering bracket 13a at a position below the material receiving hopper 11 since and the upper contractive member 12 and the lower contractive member 17 can contract and expand. Further, it is lowered through contraction of the contractive rods 16a.

While in the case of the supply device 10 of this embodiment the electric cylinders 16 are used as described above, it suffices for the ascent/descent range of the material supplier 13 to be approximately 100 mm at maximum, so that it is also possible to adopt other raising/lowering means, such as hydraulic cylinders, a mechanical jack or a cam mechanism.

Figure 2:
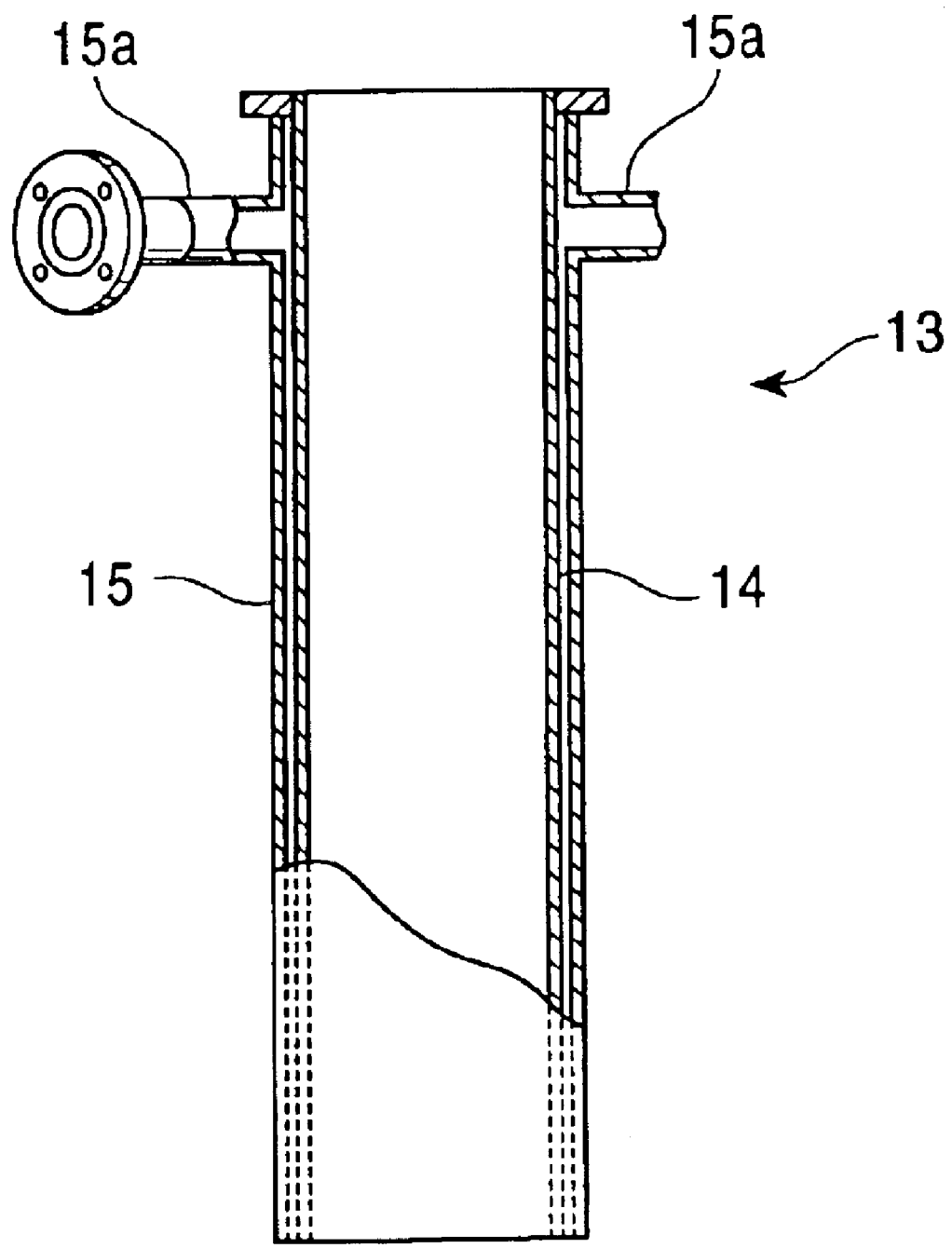
FIG. 2 is a schematic diagram illustrating a material supply means in the supplying apparatus of the first aspect of the present invention.

As shown in FIG. 2, the cylindrical member 13 serving as the material supplier is equipped with a cooling means. That is, the cylindrical member 13 comprises a supply pipe 14 for supplying the pellets P in the material supply hopper 11 onto the hearth 3a, and a water cooling jacket fitted onto the supply pipe 14 and having cooling water inlet/outlet ports 15a and 15b. Due to this water cooling jacket 15, it is possible to cool the supply pipe 14 with water. Due to this arrangement, it is possible to prevent the oily components contained in the granular raw material for reduced iron from adhering to the inner wall of the supply pipe 14.

While in this embodiment the water cooling jacket 15 is used, it is also possible, for example, to wind a tube around the outer periphery of the supply pipe 14 and cause water to flow through this tube, thereby cooling the supply pipe 14. Thus, the cooling means is not restricted to the water cooling jacket. Further, the coolant is not restricted to water; it is also possible to use vapor, gas, etc.

The operation of the supply device 10 for pellets P of the above embodiment will now be described. If the amount of pellets P discharged from the drier 1 fluctuates, the fluctuation is absorbed by the material receiving hopper 11, and the interior of the supply pipe 14 is maintained in a condition in which it is filled with pellets P. Thus, it is possible to reduce the amount of outside air allowed to enter the movable hearth furnace 3, and the granular raw material for reduced iron reduced in the movable hearth furnace 3 does not undergo oxidation again, so that it is possible to produce a granular reduced iron which is superior in quality than that in the prior art.

Further, since it is possible to freely adjust the gap between the lower end of the supply pipe 14 and the hearth 3a by means of the electric cylinders 16 provided outside the movable hearth furnace 3, it is possible to adjust the amount of pellets P supplied onto the hearth 3a with higher accuracy than in the technique as disclosed in U.S. Pat. No. 5,885,521. Further, as stated above, the interior of the supply pipe 14 is filled with pellets P, and the speed at which they fall onto the hearth 3a of the movable hearth furnace 3 is reduced.

Thus, in this embodiment, the pellets P are not broken or pulverized, so that it is possible to reduce the pellets P to a sufficient degree by the movable hearth furnace 3. A deterioration in the quality of the granular reduced iron is prevented. Further, there is no fear of a part of the powder being scattered in the flue gas as the secondary dust, so that there is no reduction in yield or the value of the secondary dust. Further, since the supply pipe 14 is cooled with water by means of the water cooling jacket 15, no oily components contained in the pellets P are allowed to adhere to the inner wall of the supply pipe 14. Thus, it is possible to smoothly discharge the pellets P from the supply pipe 14 and continue to adjust the supply amount of the pellets with higher accuracy than in the technique as disclosed in U.S. Pat. No. 5,885,521, and that for a long period of time, so that it is advantageously possible to greatly contribute to an improvement in the quality of the granular reduced iron.

First Embodiment

Figure 3:
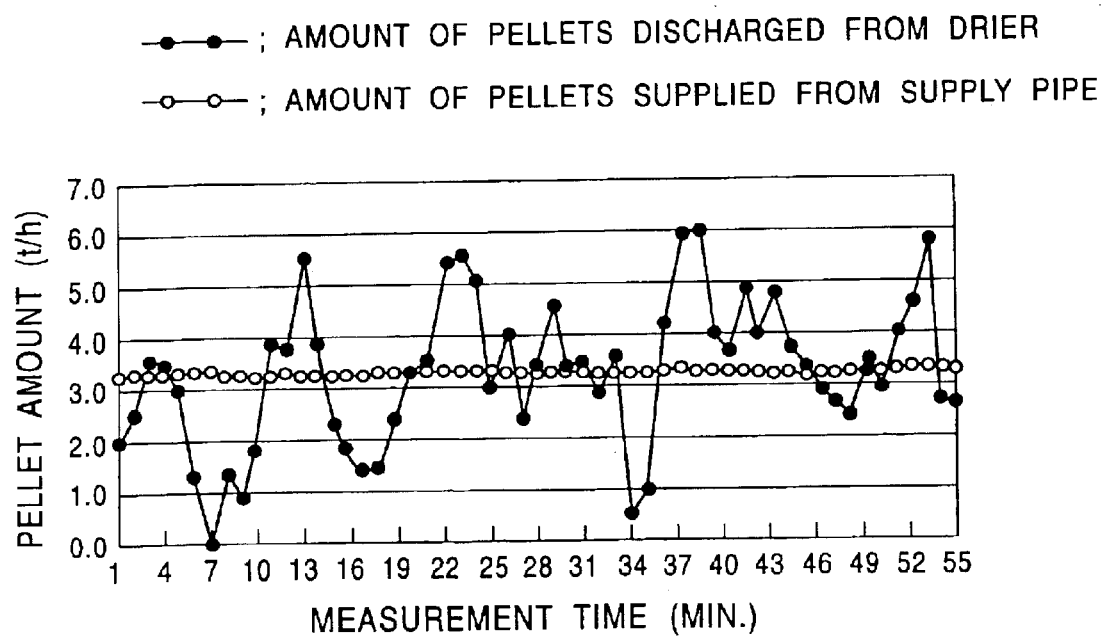
FIG. 3 is a diagram illustrating the relationship between the amount of pellets discharged from a drier and the amount of pellets supplied from a supply pipe.

Next, an embodiment adopting this pellet supply device will be described with reference to Table 1, which shows the relationship between the gap T and the pellet supply amount, Table 2, which shows the relationship between the pellet diameter and the supply amount, and FIG. 3 which illustrates the relationship between the amount of pellets discharged from the drier and the amount of pellets supplied from the supply pipe (The vertical axis indicates the pellet amount (t/h), and the horizontal axis indicates the measurement time (min.); the closed circles represent the amount of pellets discharged from the drier, and the open circles represent the amount of pellets supplied from the supply pipe.)

First, the relationship between the gap T between the forward end of the supply pipe 14 and the hearth 3a and the amount of pellets P supplied onto the hearth 3a was obtained. The result is shown in Table 1.

The speed at which the hearth 3a moves is kept constant.

TABLE 1

| No. | Gap T (mm) | Average pellet diameter (mm) | Supply amount (t/h) |
| --- | --- | --- | --- |
| 1 | 30 | 18.3 | 1.21 |
| 2 | 40 | 18.1 | 1.78 |
| 3 | 50 | 17.9 | 2.46 |
| 4 | 60 | 18.1 | 3.22 |

According to Table 1, the larger the gap T between the lower end of the supply pipe 14 and the hearth 3a, the larger the amount of pellets P supplied from the supply pipe 14 onto hearth 3a.

Next, the relationship between the average pellet diameter and the supply amount was examined. The result is shown in Table 2.

TABLE 2

| No. | Gap T (mm) | Average pellet diameter (mm) | Supply amount (t/h) | Difference in supply amount (mass %) | Remarks |
| --- | --- | --- | --- | --- | --- |
| 4 | 60 | 18.1 | 3.22 | — | Examples in which gap T is adjusted according to average pellet diameter |
| 5 | 57 | 15.8 | 3.30 | +2.4 | |
| 6 | 64 | 20.2 | 3.26 | +1.3 | |
| 7 | 60 | 20.2 | 2.93 | −9.2 | Comparative examples in which gap T is not adjusted |
| 8 | 60 | 15.8 | 3.62 | +12.4 | |

According to Table 2, when the gap T between the lower the supply pipe 14 and the hearth 3a is adjusted according to the average diameter of the pellets P, the fluctuation in the supply amount of the pellets P is much less as compared to the case in which the gap T is not adjusted. Thus, it is possible to adjust the pellet supply amount with higher accuracy than in the technique as disclosed in U.S. Pat. No. 5,885,521.

Further, the fluctuation relationship of the amount of pellets discharged from the drier (subject to fluctuation) and the amount of pellets supplied from the supply pipe with respect to the operation time was examined. The result is shown in FIG. 3. According to FIG. 3, in spite of the fact that the amount of pellets P discharged from the drier 1 fluctuates greatly and irregularly within the range of 0 to 6.0 (t/h), it continues to be maintained at approximately 3.2 (t/h), and it can be seen that the adjustment of the gap T between the lower end of the supply pipe 14 and the hearth 3a is very effective in adjusting the amount of pellets P supplied from the supply pipe 14.

In the above-described example, the supply pipe 14 of the cylindrical member 13 has a circular cross sectional configuration and is vertically arranged. However, it is not absolutely necessary for the cross sectional configuration of the supply pipe 14 to be circular. It may also be elliptical or rectangular. Further, it is not absolutely necessary to arrange it vertically; it may also be arranged in an inclined state. Thus, the above-described embodiment should not be construed restrictively. Further, the lower end of the supply pipe 14 need not be parallel with respect to the hearth 3a as shown in FIGS. 1 and 2; it may be inclined with respect to the hearth or formed in a step-like configuration.

Further, while in the above-described example only one set of the cylindrical member 13 is provided, it is possible to provide a plurality of sets of the cylindrical members in the case of a large movable hearth furnace, that is, a movable hearth furnace whose hearth has a large width.

A leveler for a granular raw material for reduced iron for realizing a method of leveling a granular raw material for reduced iron according to a second aspect of the present invention will now be described with reference to FIG. 4, which is a side schematic view showing a main portion of a movable hearth furnace, FIG. 5, which is a sectional view taken along the line A—A of FIG. 4, FIG. 6, which is a sectional view taken along the line B—B of FIG. 4, FIG. 7A, which is a diagram illustrating a cooling system for a leveling member of a leveler according to an embodiment of the present invention, with the spiral vane being omitted, and FIG. 7B, which is a diagram illustrating a cooling system for a leveling member of a leveler according to another embodiment of the present invention, with the spiral vane being omitted.

Figure 4:
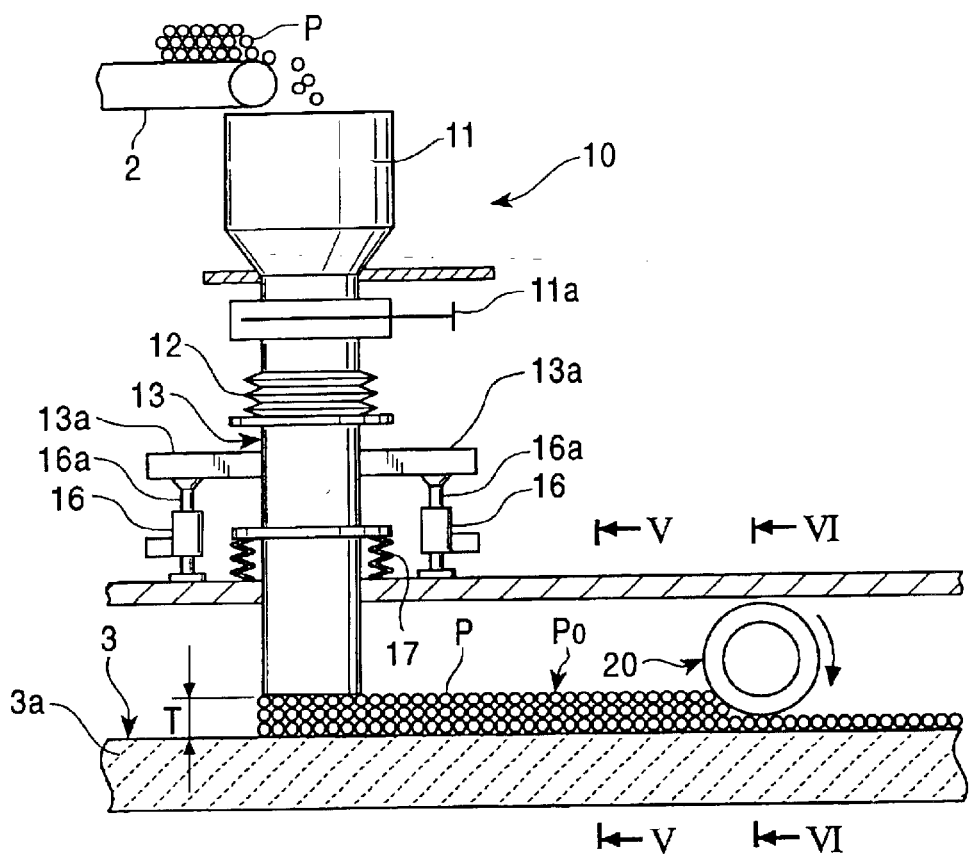
FIG. 4 is a schematic side view showing a main portion of a movable hearth furnace according to an embodiment of the second aspect of the present invention.

In FIG. 4, numeral 2 indicates a belt conveyor for conveying a granular raw material for reduced iron (hereinafter referred to as pellets) P whose main components are a carbonaceous material as reductant and iron oxide dried by a drier (not shown). The pellets P conveyed by the belt conveyor 2 are supplied onto the hearth 3a of the movable hearth furnace 3 through a supply device 10 described below. There is no particular restriction regarding the type of the hearth 3a, which may be a rotary type that rotates or a linear type that moves linearly. In some cases, the pellets P are not dried by the drier after granulation, but directly supplied onto the hearth of the movable hearth furnace for reduction.

The supply device 10 comprises a material receiving hopper 11 having a slide gate 11a at the discharge outlet and adapted to receive pellets P fed from the belt conveyor 2, a material supply means 13 consisting of a supply pipe (not shown) connected to the lower portion of the hopper 11 through the intermediation of a bellows-like upper contractive cylinder 12 and adapted to supply the pellets P received by the hopper 11 onto the hearth 3a and a water cooling jacket fitted onto the supply pipe, and electric cylinders 16 adapted to vertically move the material supply means 13 to freely adjust the gap T between the lower end of the material supply means 13 and the hearth 3a.

The slide gate 11a is solely adapted to discharge the pellets P in the material receiving hopper 11 and stop the discharge, and is used in an open state during normal operation. The reason for providing the material supply means 13 with a water cooling jacket is that when the supply pipe reaches high temperature due to the radiation heat from the hearth 3a, the oily component contained in the pellets P is allowed to adhere to the inner peripheral surface of the supply pipe and grow to thereby hinder the discharge of the pellets P; by cooling the supply pipe, the adhesion of the oily component is prevented.

A bellows-like lower contractive cylinder 17 is fitted onto the material supply means 13 at the position where it passes through the movable hearth furnace 3, and the upper end of the lower contractive cylinder 17 is hermetically fastened to a flange provided in the outer periphery of the material supply means 13, and the lower end thereof is hermetically fastened to the movable hearth furnace 3, whereby outside air is prevented from entering the furnace 3.

The electric cylinders 16 are arranged above the movable hearth furnace 3, and adapted to push upward a raising/lowering bracket 13a protruding from the central portion of the outer periphery of the material supply means 13 with respect to the vertical direction thereof. That is, when the contractive rods 16a of the electric cylinders 16 are expanded, the material supply means 13 is pushed upward through the raising/lowering bracket 13a at a position below the material receiving hopper 11 since the upper contractive cylinder 12 and the lower contractive cylinder 17 can expand and contract, and when the contractive rods 16a are contracted, the material supply means 13 is lowered. While in the case of the supply device 10 of this embodiment the cylinders 16 are used as described above, it is also possible to adopt other means, such as hydraulic cylinders, a mechanical jack or a cam mechanism, a maximum ascent/descent range of approximately 100 mm for the material supply means 13 being sufficient.

Figure 5:
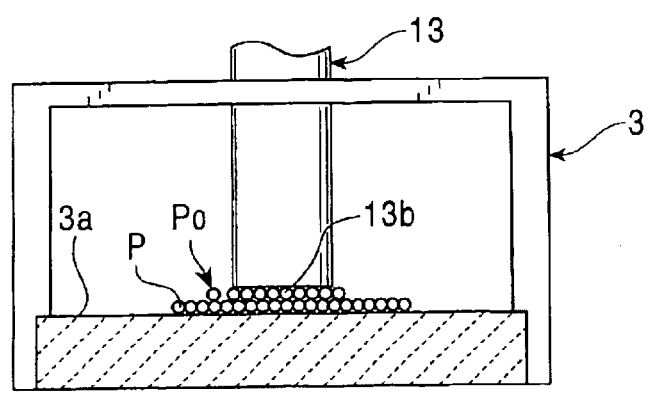
FIG. 5 is a sectional view taken along the line A—A of FIG. 4.

As shown in FIG. 5, on the downstream side with respect to the moving direction of the hearth 3a, spaced apart from the material supply means 13 by a predetermined distance, there is provided a leveler 20 constructed as described below and adapted to disperse over the entire upper surface of the hearth 3a a ridge-like pellet mass Po having a trapezoidal sectional configuration having on both sides with respect to the width direction gentle slopes based on the angle of repose of the pellets P and to level them into a single or double pellet layer.

The leveler 20 comprises a leveling member 21 described below and a rotating device (not shown) for rotating this. As shown in FIG. 6, the leveling member 21 is rotated by the rotating device; it comprises a rotation shaft 22 arranged above the hearth 3a so as to extend across the hearth 3a, and a turn vane 23 which branches off into a left-turn vane 23L and a right-turn vane 23R on the downstream side of the material discharge outlet 13b of the material supply means 13 and near a position corresponding to the center of the material supply means 13 or the material discharge outlet 13b with respect to the width direction of the hearth 3a. The position corresponding to the center is a position coinciding with the center of the material supply means 13 or the material discharge outlet 13b with respect to the width direction of the hearth 3a.

Figure 6:
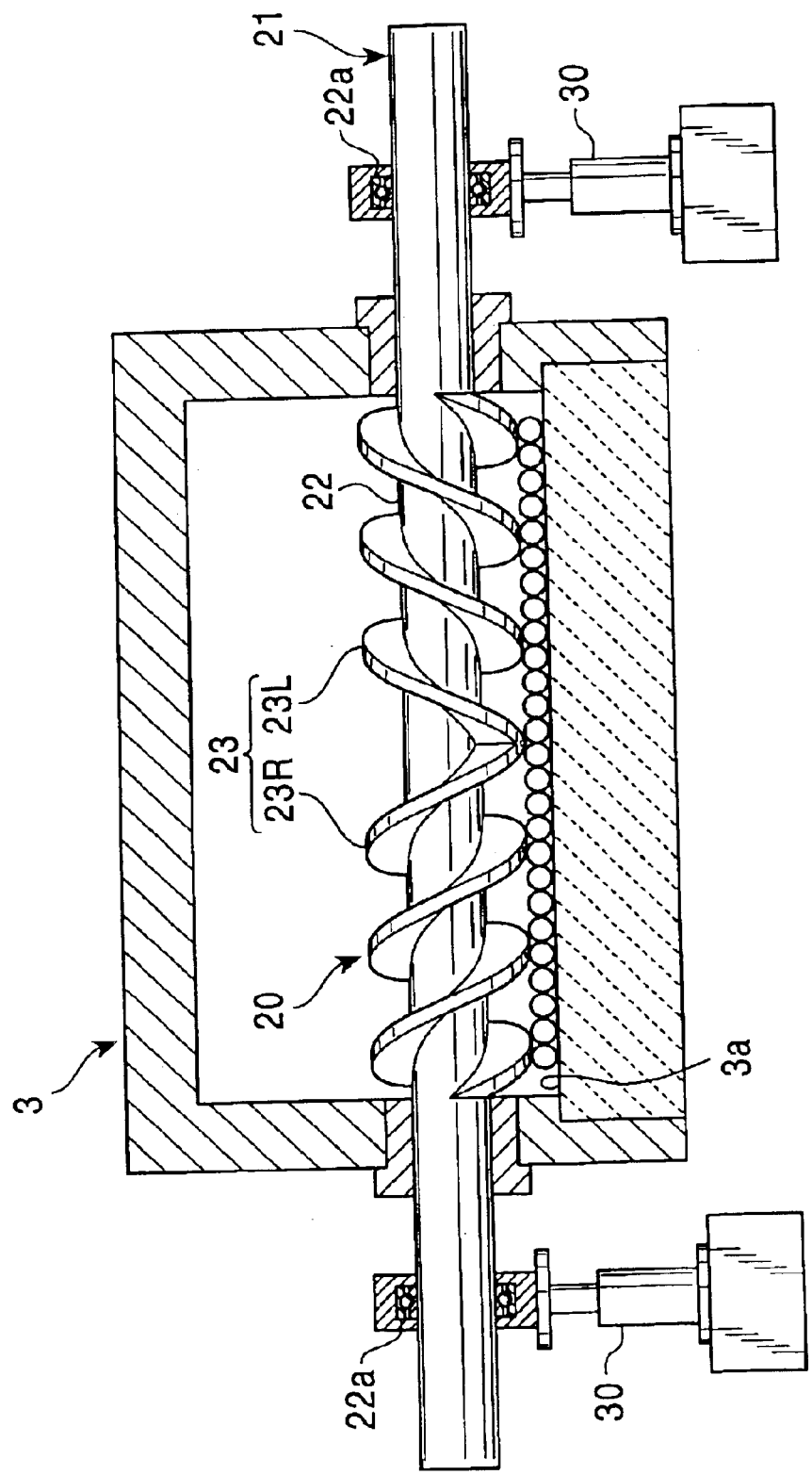
FIG. 6 is a sectional view taken along the line B—B of FIG. 4.
Figure 7A:
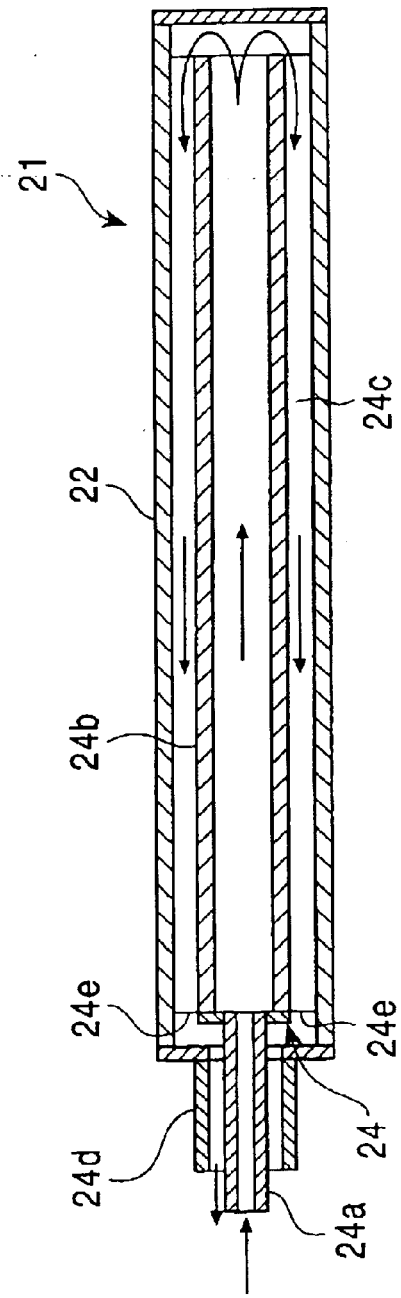
FIG. 7A is a diagram illustrating a cooling system for a leveling member for a granular raw material for reduced iron according to an embodiment of the present invention, with the spiral vane being omitted.

As shown in FIG. 6, the end portions of the rotation shaft 22 of the leveling member 21 are supported by the forward ends of rods of shaft-raising/lowering cylinders 30, which are shaft raising/lowering devices arranged on stationary bases, through the intermediation of bearings 22a. That is, the leveling member 21 is raised and lowered through the expansion and contraction of the rods of the shaft-raising/lowering cylinders 30, whereby the distance between the hearth 3a and the left-turn vane 23L and the right-turn vane 23R can be adjusted. It is also possible to adopt, for example, hydraulic cylinders, mechanical jacks or cam mechanisms, as the shaft-raising/lowering devices.

When the amount of pellets P supplied is increased by enlarging the gap T between the lower end of the material supply means 13 and the hearth 3a or when the average diameter of the pellets P is increased, the leveling member 21, which is operated in interlock with the material supply means 13, is raised so that the distance between the hearth 3a and the spiral vane 23 may increase, whereas when the amount of pellets P supplied is reduced by reducing the gap T or when the average diameter of the pellets P is reduced, it is lowered so that the distance between the hearth 3a and the spiral vane 23 may be reduced.

Due to this arrangement, the leveling member 21 is raised reliably in conformity with any variation such as an increase the supply amount of pellets P or an increase in the average diameter of the pellets P, and no excessive load is applied to the pellets P, so that it is possible to reliably disperse and level the pellets P on the hearth 3a while preventing breakage or pulverization of the pellets P. Conversely, the leveling member 21 is lowered reliably in conformity with any variation such as a reduction in the supply amount of the pellets P or a reduction in the average diameter of the pellets P, and the spiral vane 23 is not separated from the pellets P, so that it is possible to reliably disperse and level the pellets P on the hearth 3a.

Further, the leveling member 21 is provided with a cooling means 24 described below for cooling the rotation shaft 22 in order to prevent adverse effect on the rotation due to thermal expansion as a result of an increase in temperature. As shown in FIG. 7A, the cooling means 24 comprises a cooling water supply pipe 24a fitted into the rotation shaft 22 of the leveling member 21 with some play and protruding from one end of the rotation shaft 22, a cooling water guide pipe 24b for guiding cooling water supplied from the cooling water supply pipe 24a to the other end of the rotation shaft 22, a water cooling flow path 24c defined between the outer surface of the cooling water guide pipe 24b and the inner surface of the rotation shaft 22 and adapted to cause the cooling water flowing out of the cooling water guide pipe 24b to flow back to the cooling water supply pipe 24a side, and a cooling water discharge pipe 24d fitted onto the cooling water supply pipe 24a and adapted to discharge the cooling water whose temperature has been raised as a result of cooling the rotation shaft 22 through the cooling water flow path 24c to the exterior of the system. Of course, the cooling water guide pipe 24b is supported by support ribs 24e which protrude from the outer periphery of the cooling water guide pipe 24b and whose ends are in contact with the rotation shaft 22.

Figure 7B:
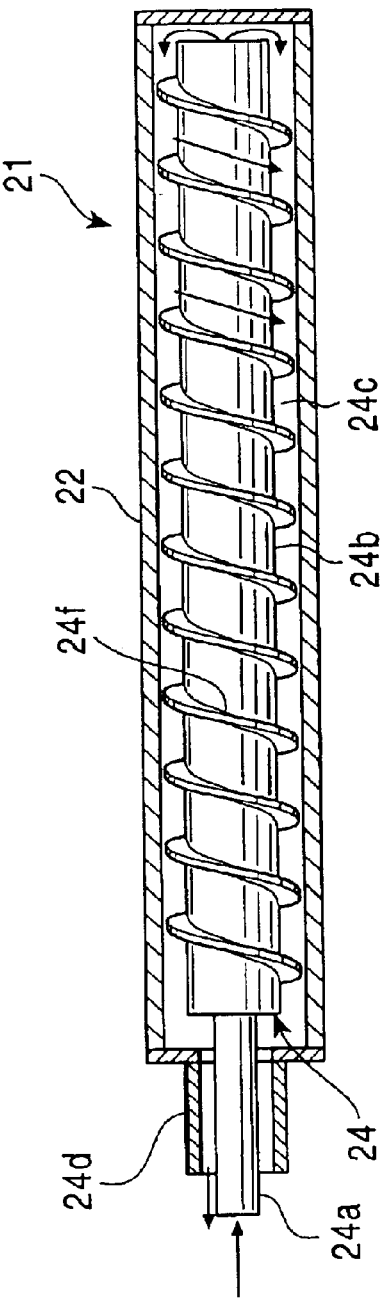
FIG. 7B is a diagram illustrating a cooling system for a leveling member for a granular raw material for reduced iron according to another embodiment of the present invention, with the spiral vane being omitted.
Figure 8:
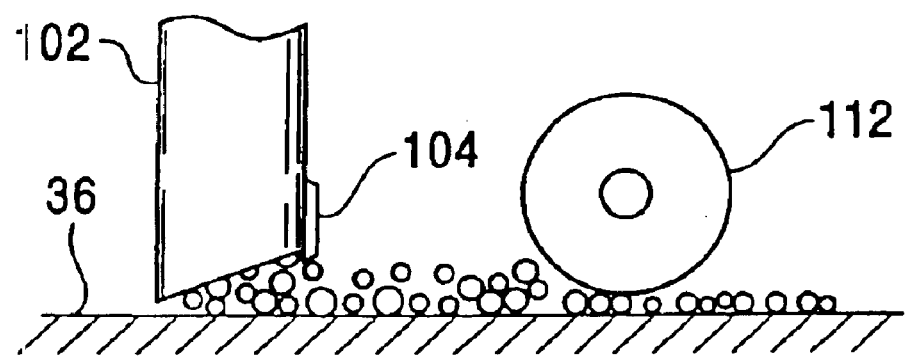
FIG. 8 is a side view of a supplying apparatus, showing a leveler for leveling a supplied material or pellets disclosed in U.S. Pat. No. 5,885,521.

Further, as shown in FIG. 7B, it is also possible to provided on the outer periphery of the cooling water guide pipe 24b a spiral cooling water guide vane 24f whose end edge is fitted onto the inner surface of the rotation shaft 22. In this construction, it is possible to reduce the sectional area of the flow path for the cooling water to thereby improve the cooling efficiency. Thus, this construction provides a superior effect of reducing the amount of cooling water supplied as compared with the case of the cooling means 24 shown in FIG. 7A. While in the examples shown in FIGS. 7A and 7B the cooling means 24 has a double pipe construction, it is also possible to provide a water cooling coil inside the rotation shaft or provide a fin or, further, adopt a triple pipe construction. Thus, the cooling means is not restricted to the double pipe construction. Further, the coolant is not restricted to cooling water. It is also possible to use vapor, gas, etc. In FIGS. 7A and 7B, the arrows indicate the direction in which the cooling water flows.

The method of leveling a granular raw material for reduced iron using the leveler, constructed as described above, will now be described. The pellets P conveyed by the belt conveyor 1 and fed into the material receiving hopper 11 are supplied onto the hearth 3a of the movable hearth furnace from the material discharge outlet 13b of the material supply means 13. The ridge-like pellet mass Po with a trapezoidal sectional configuration whose thickness is maximum at the central position of the material supply means 13 is conveyed to the downstream side through the movement of the hearth 3a while maintaining its trapezoidal configuration. When it reaches the position where the leveling member 21 is arranged, the maximum thickness portion of the ridge-like pellet mass Po is divided into two by the left-turn and right-turn vanes 23L and 23R branching off at a position corresponding to the center of the material supply means 13 or the material discharge outlet 13b, and moved from the portion near the center to both ends with respect to the width direction of the hearth 3a to be dispersed, being formed into a single or double layer by maintaining the leveling member 21 at an appropriate height.

In this leveling process for the pellets P, when the supply amount of the pellets P is increased or the average diameter of the pellets P is increased, the leveling member 21 is raised so that the distance between the hearth 3a and the spiral vane 23 may be increased, whereas when the supply amount of the pellets P is reduced or when the average diameter of the pellets P is reduced, it is lowered so that the distance between the hearth 3a and the spiral vane 23 may be reduced. Further, according to the increase/decrease speed of the supply amount of the pellets P and the variation speed of the average diameter, the expansion/contraction speed at which the distance between the hearth 3a and the spiral vane 23 is expanded and contracted is adjusted, the leveling member 21 being raised or lowered in conformity with minute fluctuation in the supply amount of the pellets P.

Thus, independently of the fluctuation in the supply amount of the pellets P and the average diameter thereof, the pellets P are not caught between the leveling member 21 and the hearth 3a, so that no excessive crushing force is applied to the pellets P. Further, the spiral vane 23 is separated from the pellets P, so that it is possible to reliably disperse and level the pellets P on the entire surface of the hearth 3a while preventing breakage or pulverization of the pellets P.

Thus, in the leveler of this embodiment, the pellets P are less subject to breakage or pulverization. In addition, the pellets are reliably dispersed and leveled on the entire surface of the hearth 3a. Thus, the pellets P are reduced to a sufficient degree, so that the quality of the granular reduced iron is improved, and since the amount of material scattered in the flue gas as the secondary dust is small, no reduction in yield is involved. Further, as stated above, to effectively utilize the secondary dust, it is desirable for the amount of metal, such as zinc or lead, evaporated from the pellets P through the heating and reduction of the pellets P in the movable hearth furnace to be large. Since the powder of the pellets P is not mixed with the secondary dust, there is advantageously no fear of the value of the secondary dust deteriorating.

While in the above-described example one set of material supply means 13 is arranged, it is possible to augment the number of sets of material supply means 13 according to the capacity of the movable hearth furnace 3, that is, the width of the hearth 3a. In this case, according to the number of sets of material supply means 13, the number of sets of left-turn and right-turn vanes of the leveling member 21 is augmented, or the number of leveling members 21 arranged in the width direction of the hearth 3a is augmented. When the amount of the granular raw material for reduced iron supplied onto the hearth 3a is large, it is possible to install a plurality of leveling members 21 in the moving direction of the hearth 3a. In this case, the farther it is from the material supply means 13, the smaller the distance between the hearth 3a and the spiral vane 23.

Further, while in the above-described example the material supply means 13 comprises a supply pipe and a water cooling jacket fitted onto the supply pipe, and is arranged vertically, the material supply means 13 may also be a chute or a conveyor, or it may be arranged in an inclined state. Further, the sectional configuration of the supply pipe may be circular, elliptical, rectangular or a shape different from any of them. Further, while the lower end of the material discharge outlet 13b is formed so as to be parallel to the hearth 3a, this should not be construed restrictively. It may be inclined with respect to the hearth 3a, or formed in a step-like configuration.

The carbonaceous material as reductant, which is a main component of the granular raw material for reduced iron, may be, for example, coal, coke, char, or oil coke. The iron oxide may be, for example, iron ore, iron oxide concentrate, iron oxide as by-product, blast furnace dust, or waste of a steel mill or the like.

There is no particular restriction regarding the granular raw material for reduced iron. It may be, for example, of a pellet-like or a briquette-like configuration.

What is claimed is:

1. An apparatus for supplying a granular raw material for reduced iron, comprising:
   a material supply means for supplying a granular raw material for reduced iron onto a hearth of a movable hearth furnace; and
   a leveler for the granular raw material for reduced iron arranged on the downstream side with respect to the moving direction of the hearth of the material discharge outlet for discharging the granular raw material for reduced iron from the material supply means and adapted to disperse and level the granular raw material for reduced iron supplied onto the hearth over the upper surface of the hearth, the leveler comprising:
   a rotation shaft inside the movable hearth furnace, wherein the rotation shaft is supported by a shaft raising/lowering device so as to be vertically movable;
   a leveling member provided at the outer periphery of the rotation shaft and comprising a spiral vane adapted to move the granular raw material for reduced iron on the hearth in the width direction of the hearth; and
   a rotating device for rotating the rotation shaft.

2. An apparatus for supplying a granular raw material for reduced iron, comprising:
   a material supply means for supplying a granular raw material for reduced iron onto a hearth of a movable hearth furnace; and
   a leveler for the granular raw material for reduced iron arranged on the downstream side with respect to the moving direction of the hearth of the material discharge outlet for discharging the granular raw material for reduced iron from the material supply means and adapted to disperse and level the granular raw material for reduced iron supplied onto the hearth over the upper surface of the hearth, the leveler comprising:
   a rotation shaft inside the movable hearth furnace;
   a leveling member provided at the outer periphery of the rotation shaft and comprising a spiral vane adapted to move the granular raw material for reduced iron on the hearth in the width direction of the hearth; and
   a rotating device for rotating the rotation shaft, wherein the spiral vane is composed of a left-turn vane and a right-turn vane.

3. An apparatus for supplying a granular raw material for reduced iron according to claim 2, wherein the spiral vane is branched off into the left-turn vane and the right-turn vane near a position corresponding to the center of the material supply means or the material discharge outlet.

4. An apparatus for supplying a granular raw material for reduced iron according to claim 1, wherein the leveling member is equipped with a cooling means for cooling the rotation shaft.

5. An apparatus for supplying a granular raw material for reduced iron comprising:
   a material supply means for supplying the material received by the material receiving hopper onto a hearth;
   a gap adjusting means for vertically moving the material supply means to thereby adjust a gap between a lower end of the material supply means and the hearth;
   a leveler for the granular raw material for reduced iron arranged on the downstream side with respect to the moving direction of the hearth of the material discharge outlet for discharging the granular raw material for reduced iron from the material supply means and adapted to disperse and level the granular raw material for reduced iron supplied onto the hearth over the upper surface of the hearth, the leveler comprising:
   a rotation shaft inside the movable hearth furnace;
   a leveling member provided at the outer periphery of the rotation shaft and comprising a spiral vane adapted to move the granular raw material for reduced iron on the hearth in the width direction of the hearth; and
   a rotating device for rotating the rotation shaft.

6. An apparatus for supplying a granular raw material for reduced iron according to claim 5, wherein the rotation shaft of the spiral vane is vertically moved with the vertical movement of the material supply means.

7. An apparatus for supplying a granular raw material for reduced iron onto a moving hearth of a moving hearth furnace, comprising:
   material supply means formed with a cylindrical material supply member for supplying material received by a material supply hopper onto the hearth; and
   gap adjusting means for vertically moving the material supply means to thereby adjust a gap between the lower end of the material supply means and the hearth,
   wherein the material supply means is filled with the raw material.

8. An apparatus for supplying a granular raw material for reduced iron according to claim 7, further comprising a cooler provided in the material supply means to cool the material supply means.

* * * * *

UNITED STATES PATENT AND TRADEMARK OFFICE
CERTIFICATE OF CORRECTION

PATENT NO. : 6,811,743 B2
DATED : November 2, 2004
INVENTOR(S) : Harada

It is certified that error appears in the above-identified patent and that said Letters Patent is hereby corrected as shown below:

<u>Title page,</u>
Item [73], Assignee, should read:
-- [73] Assignee: Kabushiki Kaisha Kobe Seiko Sho (Kobe Steel, Ltd.), Kobe (JP) --

Signed and Sealed this

Twenty-second Day of March, 2005

JON W. DUDAS
*Director of the United States Patent and Trademark Office*